US011132446B2

(12) United States Patent
Carter et al.

(10) Patent No.: US 11,132,446 B2
(45) Date of Patent: Sep. 28, 2021

(54) BLOCKCHAIN SYSTEM FOR ASSESSMENT AND MANAGEMENT OF ASSETS

(71) Applicant: Bank of America Corporation, Charlotte, NC (US)

(72) Inventors: Lonnie Jason Carter, Kingwood, TX (US); Cris Jay Gwin, Riverview, FL (US); Theresa Kruse Leahy, Matthews, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 166 days.

(21) Appl. No.: 16/170,946

(22) Filed: Oct. 25, 2018

(65) Prior Publication Data

US 2020/0134189 A1 Apr. 30, 2020

(51) Int. Cl.
*G06F 21/00* (2013.01)
*G06F 21/57* (2013.01)
*H04L 9/06* (2006.01)

(52) U.S. Cl.
CPC .......... *G06F 21/577* (2013.01); *H04L 9/0637* (2013.01); *G06F 2221/033* (2013.01); *H04L 2209/38* (2013.01)

(58) Field of Classification Search
CPC . H04L 9/0637; H04L 2209/38; G06F 21/577; G06F 2221/033
See application file for complete search history.

(56) References Cited

U.S. PATENT DOCUMENTS

| | | |
|---|---|---|
| 7,975,286 B1 | 7/2011 | Fickey et al. |
| 8,576,095 B2 | 11/2013 | Harmon et al. |
| 9,374,389 B2 | 6/2016 | Bishop et al. |
| 9,438,616 B2 | 9/2016 | Singla et al. |
| 9,740,892 B2 | 8/2017 | Lombardi et al. |
| 10,021,138 B2 | 7/2018 | Gill et al. |
| 2017/0046652 A1 | 2/2017 | Haldenby et al. |
| 2017/0046664 A1 | 2/2017 | Haldenby et al. |
| 2017/0046698 A1 | 2/2017 | Haldenby et al. |
| 2017/0243193 A1 | 8/2017 | Manian et al. |
| 2018/0062941 A1 | 3/2018 | Brown et al. |
| 2018/0108089 A1 | 4/2018 | Jayachandran |
| 2018/0167198 A1 | 6/2018 | Muller et al. |
| 2018/0189528 A1 | 7/2018 | Hanis et al. |
| 2018/0218343 A1 | 8/2018 | Kolb et al. |
| 2019/0132350 A1 | 5/2019 | Smith et al. |
| 2019/0172073 A1 | 6/2019 | Wiig et al. |
| 2019/0250898 A1* | 8/2019 | Yang ..................... G06F 9/547 |
| 2019/0251489 A1 | 8/2019 | Berti et al. |

(Continued)

*Primary Examiner* — Joseph P Hirl
*Assistant Examiner* — Chi D Nguy
(74) *Attorney, Agent, or Firm* — Michael A. Springs; Moore & Van Allen PLLC; Seongun M. Hong (57) ABSTRACT

The present disclosure is directed to a novel system for using a distributed blockchain ledger to conduct, manage, and store application assessment data. In particular, computing systems may be used to perform assessments on the various applications within the enterprise environment and store the assessments as data records within the blockchain. The entity system may further comprise one or more blockchain interjectors which may trigger the addition of updated data records for one or more application assessments in the blockchain. In this way, the system provides for a highly efficient way to perform application assessments.

14 Claims, 4 Drawing Sheets

(56) References Cited

U.S. PATENT DOCUMENTS

| | | | |
|---|---|---|---|
| 2019/0303579 A1* | 10/2019 | Reddy | G06F 21/57 |
| 2019/0317935 A1 | 10/2019 | Berti et al. | |
| 2019/0318350 A1 | 10/2019 | Hinkel et al. | |
| 2019/0354922 A1 | 11/2019 | Berti et al. | |
| 2020/0014720 A1* | 1/2020 | Giura | H04L 63/20 |

* cited by examiner

BLOCKCHAIN SYSTEM FOR ASSESSMENT AND MANAGEMENT OF ASSETS

FIELD OF THE INVENTION

The present disclosure embraces a system, computer program product, and computer-implemented method for a system for assessing and managing applications using a blockchain. In particular, the system may comprise a blockchain distributed ledger and blockchain interjectors to automatically store, manage, and/or update application assessments.

BACKGROUND

Within an entity's network, manually performing assessments on the various applications (e.g., for standards compliance, cybersecurity practices, or the like) within the enterprise environment may be a time-consuming and duplicative process. Accordingly, there is a need for a more efficient and error-free way to conduct the application assessment process.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for using a distributed blockchain ledger to conduct, manage, and store application assessment data. In particular, computing systems may be used to perform assessments on the various applications within the enterprise environment and store the assessments as data records within the blockchain. The entity system may further comprise one or more blockchain interjectors which may trigger the addition of updated data records for one or more application assessments in the blockchain. In this way, the system provides for a highly efficient way to perform application assessments.

Accordingly, embodiments of the present disclosure provide a system for managing assessment data in a blockchain. The system may comprise a processor; a communication interface; and a memory having a copy of the blockchain and executable code stored thereon. The executable code, when executed by the processor, may cause the processor to receive, from an assessment computing system, a request to add a proposed data record to the blockchain, wherein the proposed data record comprises application assessment data; validate, using a consensus algorithm, the proposed data record based on the application assessment data; append the proposed data record to a block in the blockchain; detect, via a blockchain interjector, that the application assessment data requires an update; based on detecting that the application assessment data requires the update, trigger the assessment computing system to submit additional application assessment data; receive, from the assessment computing system, a second proposed data record, the second proposed data record comprising the additional assessment data; validate, using the consensus algorithm, the second proposed data record based on the additional application assessment data; and append the second proposed data record to a new block in the blockchain.

In some embodiments, the executable code further causes the processor to receive, from the assessment computing system, a request to access a graphical user interface; and provide the graphical user interface to the user via the assessment computing system, wherein the graphical user interface is configured to accept the application assessment data from the user.

In some embodiments, the application assessment data comprises an assessment parameter, wherein the additional application assessment data comprises assessment input data associated with the assessment parameter.

In some embodiments, the blockchain interjector is a security vulnerability interjector, wherein the security vulnerability interjector causes the processor to detect a presence of a security vulnerability affecting an application; and trigger the assessment computing system to submit a third proposed data record, the third proposed data record comprising application assessment data associated with the security vulnerability.

In some embodiments, the blockchain interjector is an incident interjector, wherein the incident interjector causes the processor to detect a presence of an incident affecting an application; and trigger the assessment computing system to submit a third proposed data record, the third proposed data record comprising application assessment data associated with the incident.

In some embodiments, the blockchain interjector is a periodic interjector, wherein the periodic interjector causes the processor to detect that a threshold amount of time has passed since an application was last assessed; and trigger the assessment computing system to submit a third proposed data record, the third proposed data record comprising application reassessment data.

In some embodiments, the blockchain interjector is a regulations interjector, wherein the regulations interjector causes the processor to detect a change in a regulation affecting an application; and trigger the assessment computing system to submit a third proposed data record, the third proposed data record comprising application assessment data associated with the change in the regulation.

Embodiments of the present disclosure also provide a computer program product for managing assessment data in a blockchain. The computer program product may comprise at least one non-transitory computer readable medium having computer-readable program code portions embodied therein. The computer-readable program code portions may comprise an executable portion for receiving, from an assessment computing system, a request to add a proposed data record to the blockchain, wherein the proposed data record comprises application assessment data; an executable portion for validating, using a consensus algorithm, the proposed data record based on the application assessment data; an executable portion for appending the proposed data record to a block in the blockchain; an executable portion for detecting, via a blockchain interjector, that the application assessment data requires an update; an executable portion for, based on detecting that the application assessment data requires the update, triggering the assessment computing system to submit additional application assessment data; an executable portion for receiving, from the assessment computing system, a second proposed data record, the second proposed data record comprising the additional assessment data; an executable portion for validating, using the consensus algorithm, the second proposed data record based on the additional application assessment data; and an executable portion for appending the second proposed data record to a new block in the blockchain.

In some embodiments, the computer-readable program code portions further comprise an executable portion for receiving, from the assessment computing system, a request to access a graphical user interface; and an executable portion for providing the graphical user interface to the user via the assessment computing system, wherein the graphical user interface is configured to accept the application assessment data from the user.

In some embodiments, the application assessment data comprises an assessment parameter, wherein the additional application assessment data comprises assessment input data associated with the assessment parameter.

In some embodiments, the blockchain interjector is a security vulnerability interjector, wherein the computer-readable program code portions further comprise an executable portion for detecting a presence of a security vulnerability affecting an application; and an executable portion for triggering the assessment computing system to submit a third proposed data record, the third proposed data record comprising application assessment data associated with the security vulnerability.

In some embodiments, the blockchain interjector is an incident interjector, wherein the computer-readable program code portions further comprise an executable portion for detecting a presence of an incident affecting an application; and an executable portion for triggering the assessment computing system to submit a third proposed data record, the third proposed data record comprising application assessment data associated with the incident In some embodiments, the blockchain interjector is a periodic interjector, wherein the computer-readable program code portions further comprise an executable portion for detecting that a threshold amount of time has passed since an application was last assessed; and an executable portion for triggering the assessment computing system to submit a third proposed data record, the third proposed data record comprising application reassessment data.

Embodiments of the present disclosure also provide a computer-implemented method for managing assessment data in a blockchain. The method may comprise receiving, from an assessment computing system, a request to add a proposed data record to the blockchain, wherein the proposed data record comprises application assessment data; validating, using a consensus algorithm, the proposed data record based on the application assessment data; appending the proposed data record to a block in the blockchain; detecting, via a blockchain interjector, that the application assessment data requires an update; based on detecting that the application assessment data requires the update, triggering the assessment computing system to submit additional application assessment data; receiving, from the assessment computing system, a second proposed data record, the second proposed data record comprising the additional assessment data; validating, using the consensus algorithm, the second proposed data record based on the additional application assessment data; and appending the second proposed data record to a new block in the blockchain.

In some embodiments, the method further comprises receiving, from the assessment computing system, a request to access a graphical user interface; and providing the graphical user interface to the user via the assessment computing system, wherein the graphical user interface is configured to accept the application assessment data from the user.

In some embodiments, the application assessment data comprises an assessment parameter, wherein the additional application assessment data comprises assessment input data associated with the assessment parameter.

In some embodiments, the blockchain interjector is a security vulnerability interjector, wherein the method further comprises detecting a presence of a security vulnerability affecting an application; and triggering the assessment computing system to submit a third proposed data record, the third proposed data record comprising application assessment data associated with the security vulnerability.

In some embodiments, the blockchain interjector is an incident interjector, wherein the method further comprises detecting a presence of an incident affecting an application; and triggering the assessment computing system to submit a third proposed data record, the third proposed data record comprising application assessment data associated with the incident.

In some embodiments, the blockchain interjector is a periodic interjector, wherein the method further comprises detecting that a threshold amount of time has passed since an application was last assessed; and triggering the assessment computing system to submit a third proposed data record, the third proposed data record comprising application reassessment data.

In some embodiments, the blockchain interjector is a regulations interjector, wherein the method further comprises detecting a change in a regulation affecting an application; and triggering the assessment computing system to submit a third proposed data record, the third proposed data record comprising application assessment data associated with the change in the regulation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the application assessment blockchain system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to perform application assessments as well as store and manage application assessment data. Accordingly, the entity system may comprise blockchain database servers, Internet-of-Things ("IoT") devices, networked terminals, smart devices (e.g., smart watches), and/or other types of computing systems or devices along with their associated applications.

"Resource" as used herein may refer to a tangible or intangible object that may be used by the entity to accomplish the entity's objectives. In an exemplary embodiment, the resource may be a computer application used by the entity system.

"User" as used herein may refer to an individual who may interact with the entity system to store and/or manage application assessment data or perform application assessments. Accordingly, the user may be an agent, employee, associate, contractor, or other authorized party (e.g., an agent of a regulatory agency) who may access, use, administrate, maintain, and/or manage the computing systems within the entity system.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Distributed ledger" or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. Typically, each node maintains a full copy of the distributed ledger. In this way, even if one or more nodes become unavailable or offline, a full copy of the distributed ledger may still be accessed via the remaining nodes in the distributed ledger system.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), or the like.

In the enterprise context, an entity may use various types of resources to accomplish its objectives. For instance, an entity may install and/or execute numerous different applications on the computing systems within the entity system. Over time, it may become necessary to perform assessments of such resources (e.g., applications) a number of dimensions or parameters. For example, an entity may perform assessments of each application to analyze its vulnerability from a cybersecurity standpoint (e.g., threat vector, attack surfaces, or the like). An entity may further perform assessments of each application to analyze the application's compliance with regulations and/or internal/external policy requirements. As the landscape of the application's environment changes (e.g., in a cybersecurity or compliance context), applications may be reassessed according to modified or additional assessment parameters. As the number of applications within the entity systems and the complexity of assessment parameters increases over time, there is a need for a system for reliably, consistently, and efficiently conduct application assessments as well as store and manage application assessment data. As used herein, "application assessment data" may refer generally to data relating to the assessment of applications, and may refer to application assessment parameters, application assessment inputs associated with the assessment parameters, data entries for new applications in the entity's portfolio, or the like.

In this regard, embodiments of the present disclosure provide a system, computer program product, and method for using a distributed blockchain ledger to conduct, manage, and store application assessment data. In particular, the entity system may comprise an application inventory tool which contains a list of all of the applications in use within the entity system. Each application within the application inventory may be assessed using one or more assessment parameters. In some embodiments, the application assessments may be conducted by a user within the entity system. In other embodiments, the application assessments may be conducted automatically by one or more computing systems within the entity system. Once an assessment of an application has been performed, the results of the assessment may be submitted (e.g., as a pending data record) to be stored within a block in the blockchain ledger.

In some embodiments, the pending data record containing the proposed application assessments may be evaluated for validity via a consensus algorithm, where the consensus algorithm may require that a plurality of computing systems transmit approvals of the proposed data record to one another before the proposed data record is added to the blockchain ledger. In an exemplary embodiment, an application may be assessed according to a number of assessment parameters, where the assessment parameters indicate the compliance or non-compliance of the application with a particular policy. In such embodiments, the assessment data may be analyzed to ensure that each assessment parameter for a given application has been properly addressed (e.g., a "compliant" or "non-compliant" indicator has been assigned for each assessment parameter). In some embodiments, one or more users may manually review the proposed application assessments and transmit approvals. In other embodiments, the review of the proposed application assessments and transmission of approvals may be conducted automatically by the computing systems (e.g., nodes) within the entity system.

Once the application assessments have been stored in a block within the blockchain, the data stored therein within the blockchain ledger may be treated by the entity as a single "true" source of assessment data. That said, over time, conditions may change such that an entity may wish to perform new or updated application assessments. For example, new security threats or vector may emerge that require currently used applications to be assessed from a security standpoint. In another example, there may be new developments in regulations or policies that necessitate a reassessment of an application within the entity system.

In this regard, the application assessment system may comprise one or more "interjectors." "Interjector" as used herein may refer to a set of executable program code which may, based on detecting the occurrence of a particular condition, trigger a change in one or more assessment parameters with respect to a certain application. In an exemplary embodiment, a "threat and vulnerability" or "security vulnerability" interjector may detect the existence of a new cybersecurity threat. In some embodiments, the interjector may detect the existence of said condition based on receiving manual input by a user within the entity's systems. In other embodiments, the interjector may detect the existence of said condition automatically, such as by accessing a threat database which may be stored internally or externally. Upon detecting the occurrence of a particular condition, the interjector may trigger the addition or change in one or more assessment parameters by prompting a user to reassess the application or by automatically prompting a computing system (e.g., an assessment computing system) to perform the reassessment. In some embodiments, the interjectors may be stored and/or executed on computing systems separate from the blockchain nodes. In other embodiments, the interjectors may be stored as smart contract logic as a feature of the blockchain ledger. Using interjectors in this way helps alleviate the efficiency burden (e.g., computing efficiency) of performing repeated or duplicate assessments unnecessarily, as there is no need to reassess an application; until the interjector triggers such a reassessment, the current state of the blockchain may be taken as the single source of "truth."

The application assessment system may further comprise a user interface through which a user may interact with the blockchain ledger. The user interface may comprise graphical elements that allow the user to define, add, and/or update applications, application assessments, and/or assessment parameters within the blockchain. The user interface may further comprise notification functions which may display alert messages and/or play audible alerts. For instance, an interjector may prompt the user to define an additional assessment parameter by displaying a notification message via a notification window. The user interface may further be configured to allow the user to add, edit, or configure the various interjectors and/or their associated conditions or triggers.

The system as disclosed herein addresses a number of technology-centric challenges associated with performing application assessments and managing assessment data. By using a blockchain ledger with interjectors as described herein, the system may reduce the occurrence of inconsistent assessment data, duplicative assessments, uncertainty about an application's attack surfaces and/or compliance with regulations or policies, or the like. In turn, the computing efficiency associated with performing application assessments within the entity system may be greatly increased. Furthermore, storing assessment data within a blockchain ledger helps ensure the integrity and security of the assessment data, thereby reducing the likelihood of data loss through corruption and/or tampering.

Figure 1:
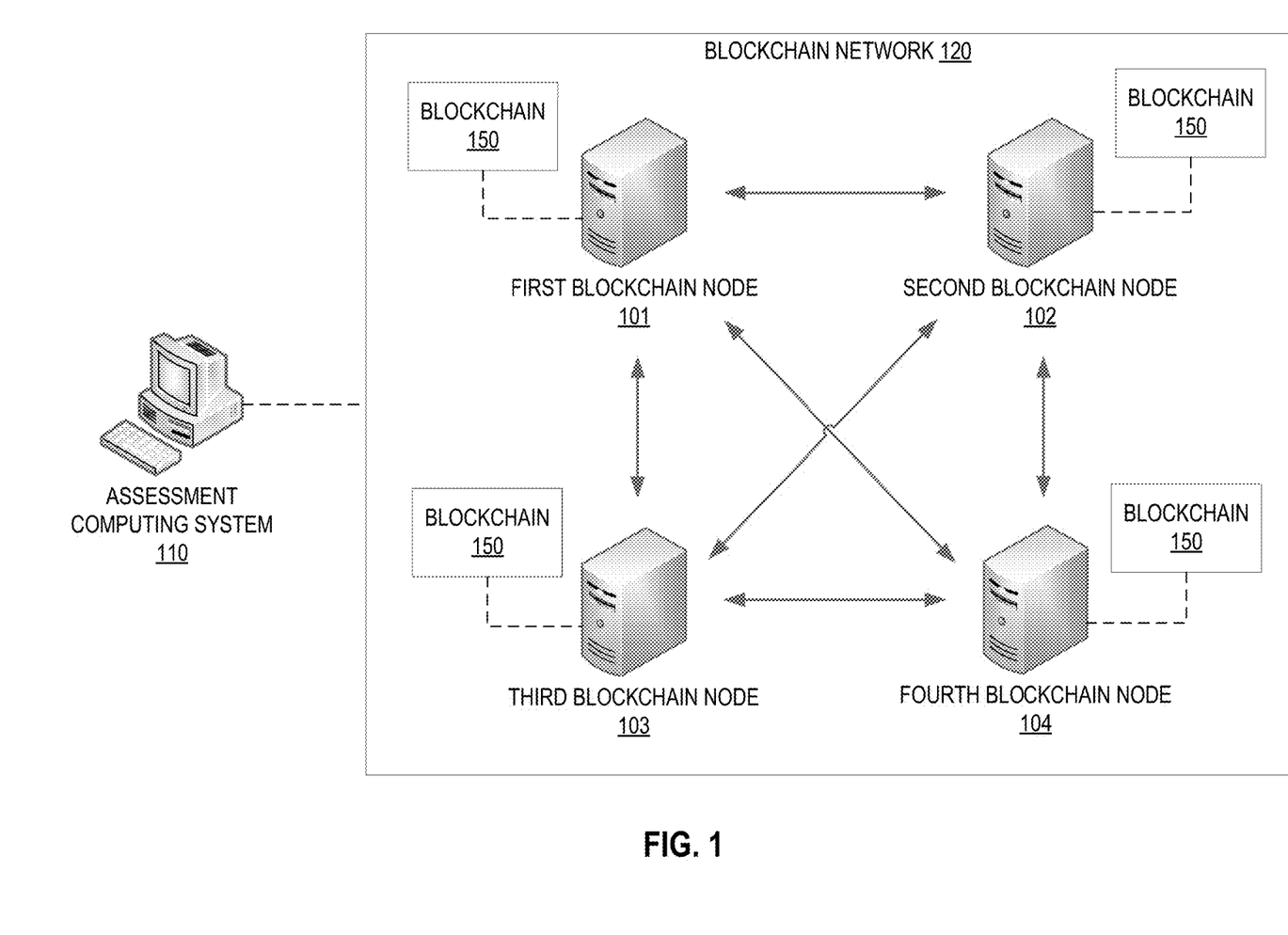
FIG. 1 is a block diagram illustrating an operating environment for the application assessment blockchain system, in accordance with some embodiments of the present disclosure.

Turning now to the figures, FIG. 1 is a block diagram illustrating an operating environment for the application assessment system, in accordance with some embodiments of the present disclosure. In particular, the operating environment may include a plurality of blockchain nodes 101, 102, 103, 104 in operative communication with one another within a blockchain network 120. The blockchain network 120, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The first blockchain node 101, the second blockchain node 102, the third blockchain node 103, and the fourth blockchain node 104 may be computing systems which host the blockchain 150. In some embodiments, the blockchain 150 may comprise the application assessment data for all applications within the entity system. Accordingly, the blockchain nodes 101, 102, 103, 104 are typically networked terminals or servers, but may also be desktop computers, laptops, smartphones or smart devices, IoT devices, or the like, or any combination thereof. Typically, each blockchain node 101, 102, 103, 104 hosts a complete copy of the blockchain 150. The contents of the various copies of the blockchain 150 hosted on the blockchain nodes 101, 102, 103, 104 may be updated to be consistent with one another via a consensus algorithm executed by the blockchain nodes 101, 102, 103, 104. In this way, a complete and verified copy of the blockchain ledger 150 may remain accessible even if the copy of the blockchain 150 stored on one or more blockchain nodes 101, 102, 103, 104 become inaccessible (e.g., due to being offline, experiencing high network latency, or the like) or corrupted (e.g., due to hardware/software errors, unauthorized modification of blockchain contents, or the like).

The operating environment may further comprise an assessment computing system 110 which may be in operative communication with the blockchain nodes 101, 102, 103, 104 of the blockchain network 120. The assessment computing system 110 may be a computing system that submits assessment data to the nodes 101, 102, 103, 104 in the form of proposed data records to be added to the blockchain 150. The assessment computing system 110 may further be used to manage interjectors and receive notifications regarding the assessment data within the blockchain 150. Accordingly, the assessment computing system 110 may be a desktop computer, laptop computer, smartphone, tablet, smart device, IoT device, single board computer, or the like. In some embodiments, the assessment computing system 110 may be operated by a user within the entity. In other embodiments, the assessment computing system 110 may automatically perform various functions to manage assessment data and/or interjectors.

It should be understood by those having ordinary skill in the art that although the blockchain nodes 101, 102, 103, 104, and/or the assessment computing system 110 are depicted as single units, each of the depicted components, or sub-components therein, may represent multiple units. In some embodiments, a given computing system as depicted in FIG. 1 may represent multiple systems configured to operate in a distributed fashion. In other embodiments, the functions of multiple computing systems may be accomplished by a single system. For instance, the functions of the assessment computing system 110 may be accomplished by one or more of the blockchain nodes 101, 102, 103, 104. It should further be understood that even though reference may be made to a single "blockchain," all singular usages of "blockchain" may also refer to multiple blockchain ledgers. For instance, separate blockchain ledgers may be stored on the nodes 101, 102, 103, 104 on a per-application or per-parameter basis.

Figure 2:
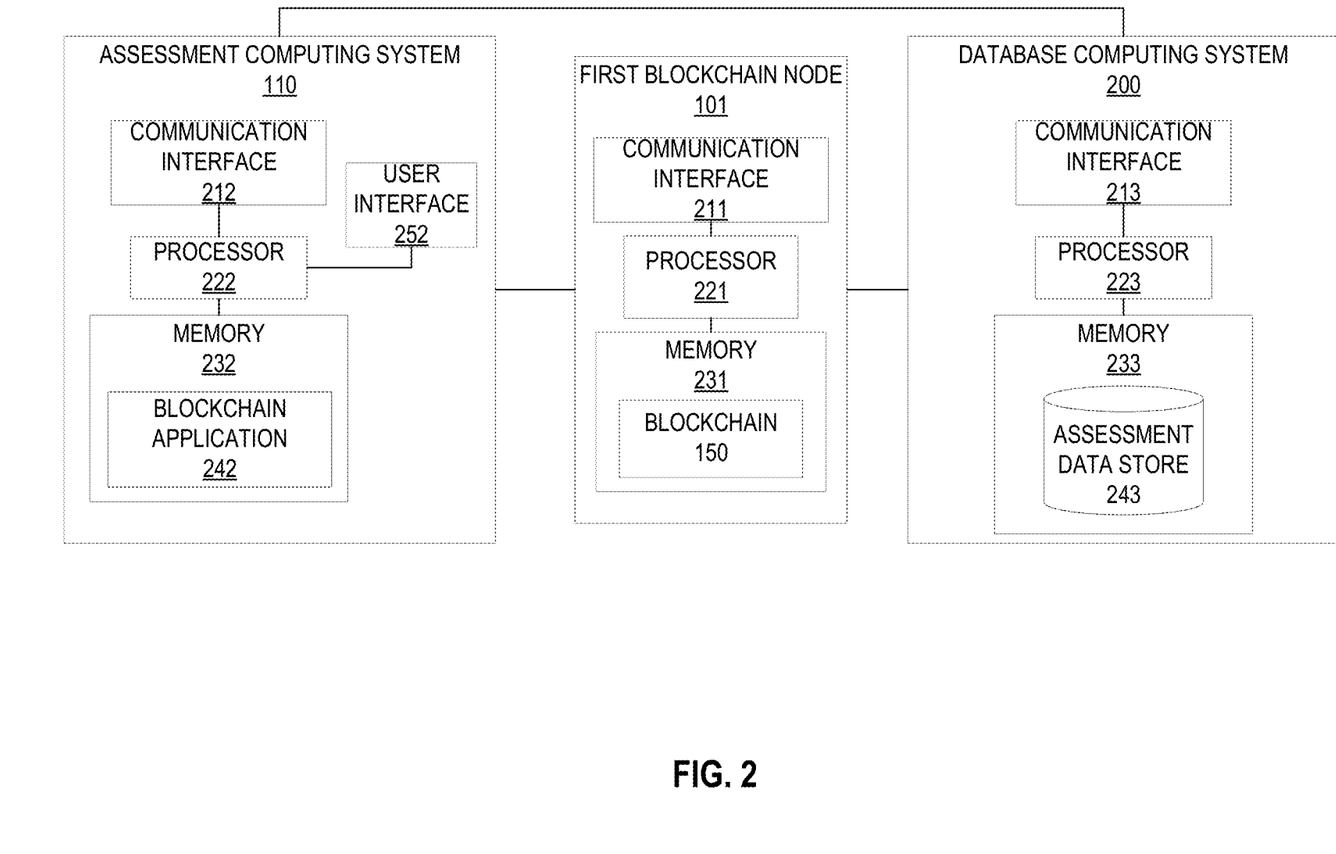
FIG. 2 is a block diagram illustrating the first blockchain node and the assessment computing system in more detail, in accordance with some embodiments of the present disclosure.

FIG. 2 is a block diagram illustrating the first blockchain node 101 and the assessment computing system 110 in more detail, in accordance with some embodiments of the present disclosure. The first blockchain node 101 may comprise a processor 221 communicably coupled to such devices as a communication interface 211 and a memory 231. It should be understood that the first blockchain node 101 as depicted in FIG. 2 may represent any or all of the blockchain nodes 101, 102, 103, 104 as depicted in FIG. 1. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The first blockchain node 101 may use the communication interface 211 to communicate with other devices over the blockchain network 120. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the first blockchain node 101 may comprise a copy of the blockchain 150. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. In some embodiments, the memory 231 of the first blockchain node 101 may further comprise smart contract logic for one or more interjectors.

Typically, the first blockchain node 101, along with the other nodes within the blockchain network 120, maintain a complete copy of the blockchain 150. The first blockchain node 101 may be configured to communicate with the other nodes to determine the contents of the blockchain 150 stored thereon. For instance, the nodes within the blockchain network 120 may use one or more consensus algorithms (e.g., Proof-of-Work, Proof-of-Stake, Practical Byzantine Fault Tolerance, or the like) to add proposed data records to each of the individual copies of the blockchain 150. In other embodiments, the nodes may execute smart contract logic to add proposed data records.

The assessment computing system 110 may also comprise a processor 222 communicatively coupled with such devices as a communication interface 212 and a memory 232. Typically, the assessment computing system 110 interacts with the first blockchain node 101 to access the blockchain 150 therein. Accordingly, the assessment computing system 110 may be a desktop computer, networked terminal, laptop computer, tablet, smartphone, or the like. In embodiments in which the assessment computing system 110 is operated by a user, the assessments computing system 110 may be configured to interface with the user, who may use the assessment computing system 110 to access the access, view, and/or submit proposed data records within the blockchain 150. The assessment computing system 110 may further be used to manage the blockchain interjectors. In this regard, the assessment computing system 110 may further comprise a user interface 252, which may comprise the hardware and software implements to accept input from and provide output to the user. The user interface 252 may comprise hardware such as a display, audio output devices, projectors, and the like, or input devices such as keyboards, mice, sensors, cameras, microphones, biometric input devices (e.g., fingerprint readers), and the like. The user interface 252 may further comprise software such as a graphical or command-line interface through which the user may provide inputs and/or receive outputs from the assessment computing system 110. It should be understood that the display on which the user interface 252 is presented may include an integrated display (e.g. a tablet or smartphone screen) within the assessment computing system 110, or an external display device (e.g. a computer monitor or television).

The memory 232 of the assessment computing system 110 may comprise a blockchain application 242 stored thereon. The blockchain application 242 may include software that allows the assessment computing system 110 to submit proposed data records to the blockchain 150, where the proposed data records comprise application assessment data (e.g., application ID, application assessment parameters, application status, or the like). In some embodiments, the assessment computing system 110 may automatically submit assessment data to the blockchain 150. In such embodiments, the blockchain application 242 may be configured to upload assessment data to the first blockchain node 101 upon being prompted by a blockchain interjector. In other embodiments, a user may use the assessment computing system 110 to upload assessment data and/or participate in consensus to validate proposed data records. In such embodiments, the blockchain application 242 may include an entity-provided application or other third party application which interfaces with the user to allow the user to communicate with the first blockchain node 101. For instance, in some embodiments, the blockchain application 242 may include a web browser or the like which allows the user to access a web server to upload assessment data, participate in validation of data records, manage blockchain interjectors, or the like. In certain embodiments, the blockchain application 242 may further comprise blockchain interjectors which prompt the addition or update of assessment data within the blockchain 150.

The first blockchain node 101 and/or the assessment computing system 110 may further be in operative communication with a database computing system 200. The database computing system 200 may comprise a communication interface 213, a processor 223, and a memory 233 having an assessment data store 243 stored thereon. The assessment data store 243 may comprise the types of data needed by the assessment computing system 110 to perform application assessments. For example, the assessment data store 243 may comprise a continuously updated list of external and/or internal policies and/or regulations with which each application within the entity system must comply. Based on the assessment data store 243, the assessment computing system 110 may define new assessment parameters or update existing assessment parameters for each application.

Figure 3:
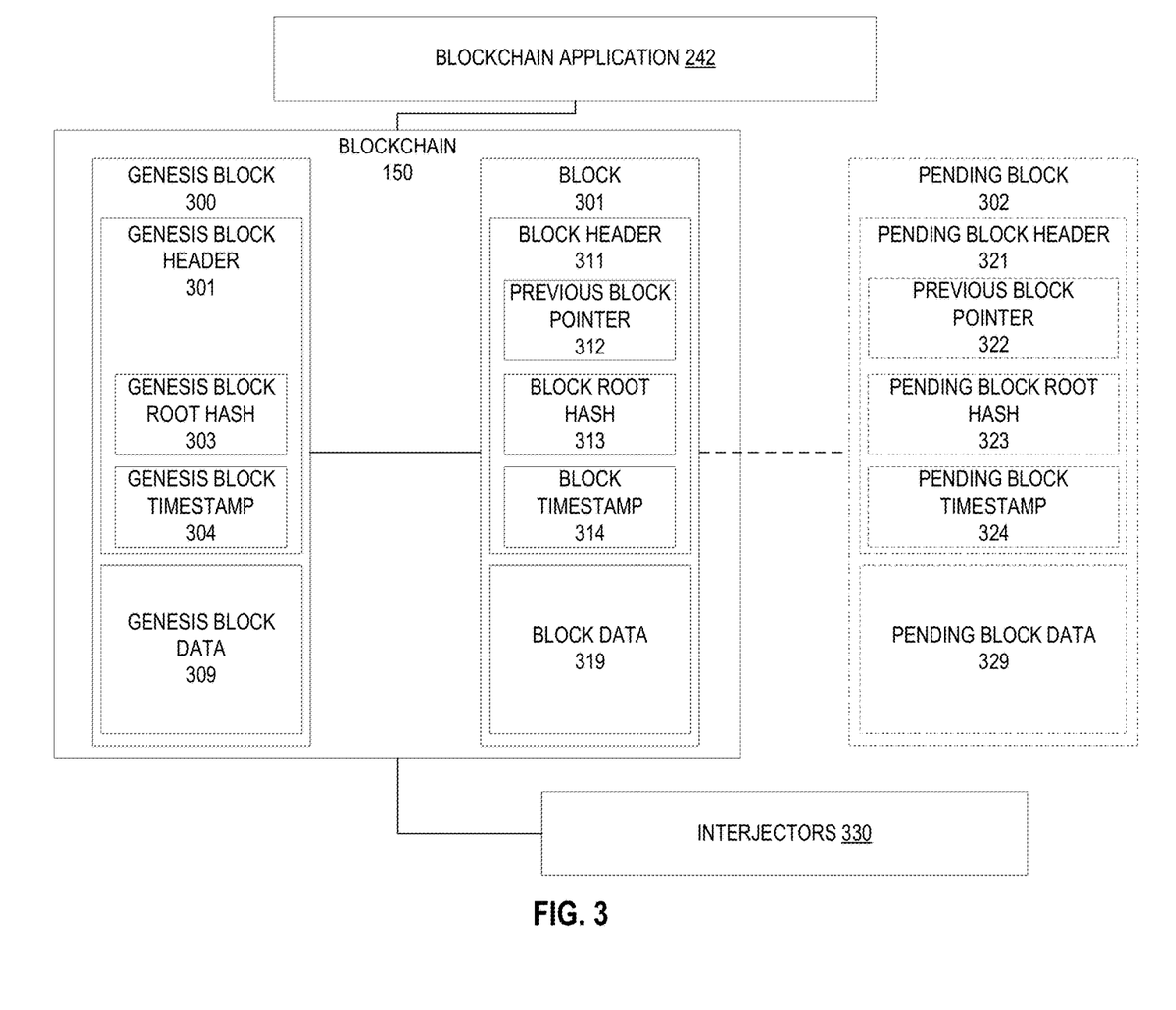
FIG. 3 is a block diagram illustrating the data structures within the blockchain, in accordance with some embodiments of the present disclosure.

FIG. 3 is a block diagram illustrating the data structures within the blockchain 150, in accordance with some embodiments. In particular, FIG. 3 depicts a plurality of blocks 300, 301 within the blockchain 150, in addition to a proposed block 302 that has been submitted to be appended to the blockchain 150. The blockchain 150 may comprise a genesis block 300 that serves as the first block and origin for subsequent blocks in the blockchain 150. The genesis block 300, like all other blocks within the blockchain 150, comprise a block header 301 and block data 309. The genesis block data 309, or any other instances of block data any blocks in the blockchain 150 may contain various data records.

The genesis block header 301 may comprise various types of metadata regarding the genesis block data 309. In some embodiments, the block header 610 may comprise a genesis block root hash 303, which is a hash derived from an algorithm using the genesis block data 309 as inputs. In some embodiments, the genesis root hash 303 may be a Merkle root hash, wherein the genesis block root hash 303 is calculated via a hash algorithm based on a combination of the hashes of each data record within the genesis block data 309. In this way, any changes to the data within the genesis block data 309 will result in a change in the genesis block root hash 303. The genesis block header 301 may further comprise a genesis block timestamp 304 that indicates the time at which the block was written to the blockchain 150. In some embodiments, the timestamp may be a Unix timestamp. In some embodiments, particularly in blockchains utilizing a PoW consensus mechanism, the block header 301 may comprise a nonce value and a difficulty value. The nonce value may be a whole number value that, when combined with a hash of the other items of metadata within the block header 301, produces a hash output that satisfies the difficulty level of the cryptographic puzzle as defined by the difficulty value. For instance, the consensus mechanism may require that the resulting hash of the block header 301 falls below a certain value threshold (e.g., the hash value must start with a certain number of zeroes, as defined by the difficulty value).

A subsequent block 301 may be appended to the genesis block 300 to serve as the next block in the blockchain. Like all other blocks, the subsequent block 300 comprises a block header 311 and block data 319. Similarly, the block header 311 comprise a block root hash 313 of the data within the block data 319 and a block timestamp 314. The block header 311 may further comprise a previous block pointer 312, which may be a hash calculated by combining the hashes of the metadata (e.g., the genesis block root hash 303, genesis block timestamp 304, and the like) within the block header 301 of the genesis block 300. In this way, the block pointer 312 may be used to identify the previous block (i.e., the genesis block 300) in the blockchain 150, thereby creating a "chain" comprising the genesis block 300 and the subsequent block 301.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 302 or "proposed block" may be submitted for addition to the blockchain 150. The pending block 302 may comprise a pending block header 321, which may comprise a pending block root hash 323, a previous block pointer 322 that points to the previous block 301, a pending block timestamp 324, and pending block data 329. Once a pending block 302 is submitted to the system, the nodes within the system may validate the pending block 302 via a consensus algorithm. The consensus algorithm may be, for instance, a proof of work mechanism, in which a node determines a nonce value that, when combined with a hash of the block header 311 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 311 is included in the pending block header 321 of the pending block 302 as the previous block pointer 322. The pending block header 321 may further comprise the pending block root hash 323 of the pending block data 329 which may be calculated based on the winning solution. The pending block 302 is subsequently considered to be appended to the previous block 301 and becomes a part of the blockchain 150. A pending block timestamp 324 may also be added to signify the time at which the pending block 302 is added to the blockchain 150. In other embodiments, the consensus mechanism may be based on a total number of consensus inputs submitted by the nodes of the blockchain 150, e.g., a PBFT consensus mechanism. Once a threshold number of consensus inputs to validate the pending block 302 has been reached, the pending block 302 may be appended to the blockchain 150. In such embodiments, nonce values and difficulty values may be absent from the block headers.

The system described herein may use one of several different paradigms for block creation. In some embodiments, a block may be generated whenever new assessment parameters or applications are defined. In some embodiments, the system may wait to receive inputs for all known assessment parameters for all applications before generating a block. In other embodiments, blocks may be generated on a per-application basis. In yet other embodiments, new blocks may be generated for each assessment that is made by the assessment computing system. Other possibilities exist, as the entity may select its block generation methods based on striking a balance between computing efficiency and detailed record keeping over a period of time.

The assessment computing system, via the blockchain application 242, may submit a proposed data record to the blockchain 150, where the proposed data record may comprise a new or updated assessment parameter, application assessment data, new or updated metadata regarding an application, or the like. In this way, the blockchain application 242 may be used to manage assessment data, assessment parameters, application data, and the like. Furthermore, because such data is added in time-stamped blocks to the blockchain, the system is able to reliably and accurately recreate the state of the resources (e.g., applications) within the entity system at any particular point in time.

The data records may comprise application assessment data associated with each application within the entity system. In particular, each application within the entity system may be assigned an application identifier (e.g., a character string, hash value, numerical identifier, or the like). For instance, in some embodiments, the applications may be labeled in numerical order (e.g., Application 1, Application 2, and the like). The assessment parameters used to assess each application may also each be assigned an assessment parameter identifier. For instance, the assessment parameters may be numbered (e.g., Assessment Parameter 1, Assessment Parameter 2, and the like). Using this structure, each application may be assessed using each assessment parameter as defined in the block.

In some embodiments, the assessment computing system may, via the blockchain application 242, participate in validating proposed data records through a consensus algorithm, along with the nodes of the blockchain 150. For example, a new assessment parameter which addresses a new regulation may be proposed to be added to the blockchain 150. In such embodiments, the assessment computing system may be used to verify that the new proposed assessment parameter adequately and accurately reflects the new regulation. The assessment computing system may further ensure that the assessment data to be entered reflects that the application assessment has been correctly executed. For instance, the system may require that certain assessment parameters with respect to an application are addressed before the assessment is considered to be valid (e.g., some assessment parameters are considered "required"). If the required assessment parameters are missing from the assessment data, the assessment computing system may either reject the proposed data record containing the assessment data or delay validating the proposed data record until the missing inputs are provided.

As described above, assessment parameters are metrics or dimensions by which an application is assessed. Some examples of assessment parameters may concern security statuses (e.g., whether the application is protected against a known security bug), rule or policy compliance (e.g., whether the application complies with an internal or external rule, regulation, or policy, such as an information security policy requirement), technical issues (e.g., system requirements, operating system, software, and/or hardware compatibility, support for standards and/or protocols, or the like), ownership, or the like. Each assessment parameter may be configured to receive an input from the assessment computing system that indicates the status of a particular assessment parameter. Such inputs may be validated by a consensus algorithm before being accepted as part of the blockchain. For example, a valid entry for a particular assessment parameter may be binary values as valid entries (e.g., "yes" or "no," "0" or "1," or the like), such as when an assessment parameter concerns whether or not an application complies with a particular information security policy. In other embodiments, valid entries may be numbers, strings of characters and/or numbers, dates, hash values, or the like.

In some embodiments, the blockchain application 242 of the assessment computing system may be used to define an initial set of assessment parameters within the block data (e.g., the genesis block data 309) of a block (e.g., the genesis block 300) for each application in the entity system. In such embodiments, when the assessment computing system submits proposed data records to be appended to the blockchain 150 in subsequent blocks, the consensus algorithm may require that an assessment parameter and application has been defined in one of the previous blocks in order for the proposed data record to be considered valid. For instance, if a proposed data record comprises an assessment for Assessment Parameter 1 with respect to Application 1, the system may first verify that the Assessment Parameter 1 and Application 1 have been defined in a previous block (e.g., the genesis block 300). If the definitions of the assessment parameter and application are not found, the proposed data record may be considered to be invalid. It should be noted that while assessment parameters may be defined in the genesis block 300, it is within the scope of the disclosure for new or updated assessment parameters and/or applications to be defined in any block within the blockchain.

Over time, it may become necessary to adjust application assessment processes in response to changes in the operating environment, technical advances, new security threats, changes in regulations or policies, or the like. In this regard, the system may use one or more interjectors 330 to cause a new block to be created which contains the new assessment parameters, assessment data, and/or application metadata. "Interjector" may generally refer to the hardware and software implements that trigger the addition or updating of assessment data within a new block (e.g., the pending block 302). In some embodiments, the interjector may be stored on the assessment computing system. In other embodiments, the interjectors may be executed as smart contracts by the nodes of the blockchain 150.

An interjector 330 may detect the existence of a condition that requires a change in the application metadata, application assessment data, application assessment parameters, or other type of data within the blockchain 150. For example, the "condition" may be the emergence of a new type of computer virus which necessitates the evaluation of particular applications to assess their vulnerability to the virus. In other embodiments, the condition may be a new internal policy with which all applications must comply, which in turn necessitates a renewed assessment of applications to ensure the compliance with the new policy. Upon detecting the condition, the interjector 330 may trigger the addition of new data records to the blockchain 150 via the blockchain application 242.

In embodiments in which the new data records are added manually, the interjector 330 may send an alert or notification to the user through the assessment computing system, where the alert or notification prompts the user to enter the necessary information (e.g., a renewed assessment, a new assessment parameter, or the like). The alert or notification may comprise a link (e.g., a hyperlink) that, when activated, opens a graphical interface on the assessment computing system (e.g., a web browser pointing to a web server) which provides graphical elements that allow the user to input the necessary information (e.g., application assessment data). Once the user submits the necessary information, the assessment computing system may submit a proposed data record to the blockchain 150, where the proposed data record contains the information provided by the user to be incorporated in to the blockchain 150. In embodiments in which the new data records are added automatically, the interjector 330 may cause the assessment computing system to automatically submit the necessary information to the blockchain 150 in the form of a proposed data record.

Various types of interjectors 330 may be used to trigger the addition of data records to the blockchain. For example, the interjectors 330 may include a "threat and vulnerability interjector" that triggers inputs of assessment data relating to a new threat or vulnerability affecting an application, a "policy interjector" or "regulations interjector" that triggers inputs of assessment data based on regulations or standards that affect an application, a "reassessment clock interjector" or "periodic interjector" which triggers reassessments after a threshold period of time has elapsed since an application has last been assessed, a "circumstance interjector" which triggers assessments based on the occurrence of certain incidents, events, or problems, or the like. It should be understood that the interjectors 330 described above are provided for exemplary purposes only, and that other types of interjectors 330 and/or triggers may be used depending on the entity's needs.

The system may further include a notification system that sends alerts or notifications based on the current verified state of the resources (e.g., applications) within the entity system. For instance, if the notification system detects that an assessment parameter has been defined but no assessment data with respect to the assessment parameter has been entered, the notification system may send an alert or notification to a user which prompts the user to enter the assessment data. In other embodiments, the notification system may detect that the assessment of an application requires further action with respect to the application. For example, the assessment data for a particular assessment parameter (e.g., the application's compliance with a particular regulation) indicates that the application fails to satisfy the assessment parameter (e.g., the assessment data entered is a "0" or "no"). In such embodiments, the notification system may send an alert or notification to the user indicating that the specified application does not comply with the particular regulation as referenced by the assessment parameter.

Figure 4:
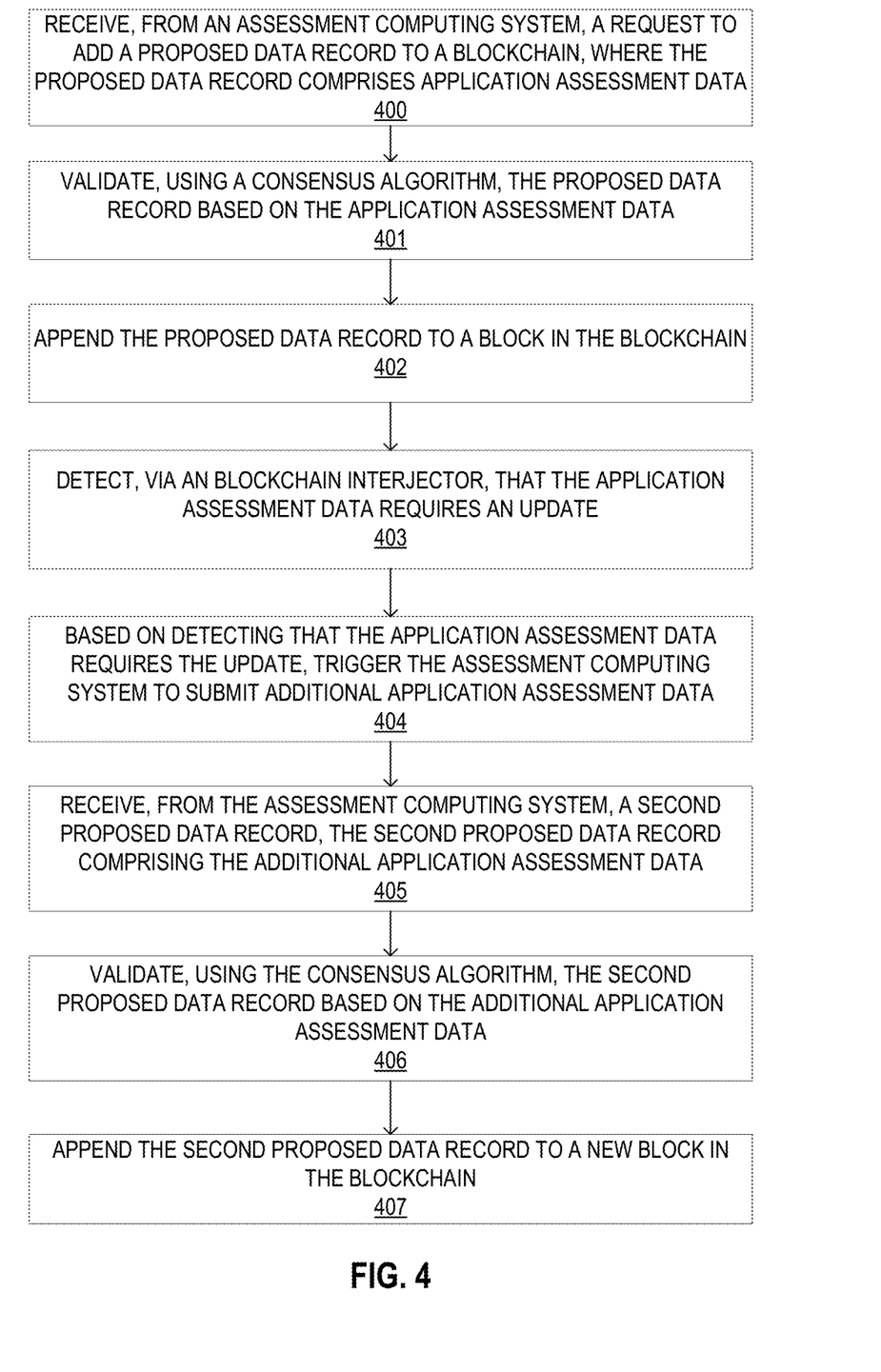
FIG. 4 is a process flow for the application assessment blockchain system, in accordance with some embodiments of the present disclosure.

FIG. 4 is a process flow for the application assessment system, in accordance with some embodiments of the present disclosure. The process begins at block 400, where the system receives, from an assessment computing system, a request to add a proposed data record to a blockchain, where the proposed data record comprises application assessment data. The application assessment data may comprise information regarding applications within an entity system and assessments performed on the applications across various metrics. Thus, in an exemplary embodiment, the application assessment data may comprise application metadata, application assessment parameters, inputs to the application assessment parameters, or the like.

The application metadata may comprise information about the applications within the entity system at are to be assessed, such as application name and/or description, ownership information, version number, operating system compatibility, or the like. The applications may be assessed according to a number of application assessment parameters, such as whether an application is in compliance with an internal or external rule, policy, or regulation, whether the application has been updated to the latest version, whether the application is protected against a security threat, whether the application is vulnerable to certain contingencies, whether the application is affected by a certain incident or event (e.g., a data breach), or the like. Accordingly, the inputs to the application assessment parameters (or "assessment parameter inputs") may comprise the findings of an application with respect to a particular assessment parameter (e.g., a finding that an application is currently running the latest version). In some embodiments, the assessment computing system may generate a proposed data record to be evaluated by the blockchain nodes. In other embodiments, a blockchain node may receive the request and generate the proposed data record based on the information contained in the request.

The process continues to block 401, where the system validates, using a consensus algorithm, the proposed data record based on the application assessment data. The system may use one or several consensus algorithms in the various embodiments. For instance, the system may use a Practical Byzantine Fault Tolerance (PBFT) algorithm, through which each blockchain node performs a number of validation checks on the proposed data record (e.g., whether the required assessment parameters have been addressed by the correct assessment parameter inputs, whether the assessment parameters reference a valid application, whether an application referenced by an assessment parameter is currently in use by the entity, whether assessment parameter inputs reference a valid assessment parameter, or the like). Based on performing the validation checks, each node may submit a consensus input to the other nodes in the blockchain network, where the consensus input is an approval or rejection of the proposed data record's validity. The PBFT algorithm may require that a threshold number of consensus inputs (e.g., at least two-thirds of nodes consensus input "yes") in favor of approving the proposed data record are received by the nodes before the proposed data is added to the blockchain. In this way, even if specific nodes in the blockchain network become offline or unavailable (e.g., network disruptions, hardware failures, data corruption, or the like), the functionality of the blockchain ledger may still be preserved.

In other embodiments, the consensus algorithm may be a PoW algorithm in which the nodes may continually perform computations to resolve a cryptographic puzzle set by the system (e.g., "mining"). Typically, a PoW algorithm may be employed by the system when the blockchain is a public blockchain wherein any member of the public may host a node and participate in consensus. In this way, the system may validate proposed data records even when the "trust levels" amongst the consensus participants are relatively low.

The process continues to block 402, where the system appends the proposed data record to a block in the blockchain. Once the proposed data record has been validated by the consensus algorithm (e.g., the threshold number of consensus inputs has been reached, or a node has calculated a "solution" to the cryptographic puzzle set by the system), the proposed data record may be considered to be a permanent part of the blockchain. Typically, the proposed data record is incorporated into the block data portion of a block in the blockchain. As described above, each block may contain multiple data records, and new blocks may be written upon the occurrence of certain events. For instance, a new block may be written when an interjector triggers the creation of the new block, as discussed in further detail below. Over time, the blockchain as described herein may provide a stable, durable, and tamper-resistant history of application assessments performed over time.

The process continues to block 403, where the system detects, via a blockchain interjector, that the application assessment data requires an update. In some embodiments, an interjector may detect the occurrence of an event or condition that triggers the need for updated application assessment data. For example, the interjector may detect that the ownership or version number of an application within the entity system has changed such that the assessment data within the blockchain no longer reflects the current state of reality. In other embodiments, an interjector may detect that a new policy or regulation has been placed into effect that necessitates a new or updated assessment parameter. In yet other embodiments, the interjector may detect that a new security vulnerability has been found (e.g., by retrieving data from a threat database) and determine that a new assessment parameter should be defined based on the new threat.

In some embodiments, the interjectors may be stored as a separate application which monitors the assessment data within the blockchain and/or pull data from internal or external databases to detect the condition (e.g., a database of rules or policies, applications currently in use, or the like). In other embodiments, the interjectors may be executed as smart contracts. In embodiments in which the interjectors are executed as smart contracts, the interjectors may be configured to automatically trigger the addition of new assessment data upon the detection of a condition precedent (e.g., an updated rule or regulation, a new security threat, change in application ownership, or the like).

It should be noted that because assessment data is validated by the consensus algorithm before being added to the blockchain, the latest information within the data records of the blockchain ledger may be considered to be valid until the interjector triggers the addition of data records to the blockchain ledger. In other words, the blockchain ledger may serve as the single source of truth for users within the entity system. In this way, the blockchain ledger eliminates the occurrence of duplicative assessments and/or improperly performed assessments. Furthermore, the targeted nature of assessments triggered by interjectors (e.g., interjectors address specific areas that need to be updated) greatly increases the efficiency of the assessments performed on the applications in the entity system.

The process continues to block 404, where the system, based on detecting that the application assessment data requires the update, trigger the assessment computing system to submit additional application assessment data. In some embodiments, the additional application assessment data may be entered manually by a user within the entity system. In such embodiments, triggering the assessment computing system may comprise automatically transmitting a notification to the assessment computing system, where the notification informs the user that the additional application assessment data is required. In some embodiments, the notification may be a message sent via SMS, E-mail, instant messaging, or the like. In such embodiments, the notification may comprise a selectable object (e.g., a button, hyperlink, or the like) which, when selected by the user via the assessment computing system, activates an application on the assessment computing system (e.g., an entity-provided application, a third party program such as a web browser, or the like) which provides a graphical interface to the user. In other embodiments, the notification may be provided through a notification window within the graphical interface.

Through the graphical interface, the user may submit assessment data inputs for one or more assessment parameters for a given application. In such embodiments, the graphical interface may display the various assessment parameters for each application within the entity system. Each assessment parameter may be associated with an input field to receive assessment input data from the user, where the input field may be a clickable button, radio button, check box, text entry field, or the like. For instance, an assessment parameter may address whether the particular application is in compliance with a certain internal policy. The user performing the assessment for the application may, through the graphical interface, provide assessment input data (e.g., "yes" or "no") to the input field associated with said assessment parameter.

In some embodiments, the user may receive further notification from an interjector through the graphical interface. For example, the user may receive a notification which states that a particular application does not comply with a certain regulation. In such embodiments, said user may be a developer, administrator, or maintainer of the application. In this way, the concerned parties may have an efficient way to receive reliable information on the current state of the entity's resources.

The process continues to block 405, where the system receives, from the assessment computing system, a second proposed data record, the second proposed data record comprising the additional application assessment data. The additional application assessment data may, in some embodiments, be provided in response to the interjector's notification. For instance, the interjector may notify the user that a periodic reassessment (e.g., yearly, quarterly, monthly, daily, or the like) is due for a particular application, where the periodic reassessment requires the additional application assessment data (e.g., application input data, new application assessment parameters, or the like). In response, the user may log into the graphical interface to submit the additional application assessment data to the nodes of the blockchain in the form of a second proposed data record.

The process continues to block 406, where the system validates, using the consensus algorithm, the second proposed data record based on the additional application assessment data. As described above with reference to block 401, the system may use any number of different consensus algorithms to validate the second proposed data record. In particular, the additional application assessment data may be verified to ensure that assessment input data references a valid assessment parameter, that assessment input data is in the acceptable from for a given assessment parameter, that the assessment data references an application currently in use, or the like.

The process concludes at block 407, where the system appends the second proposed data record to a new block in the blockchain. The new block in the blockchain comprises the additional application assessment data and is appended to the end of the blockchain. In this manner, application assessment data may be added to the blockchain in increments on an "as-needed" basis as determined by the interjectors. Arranging the blockchain system in this way ensures that assessment data is verified and updated to provide the most accurate data across the longest time span as possible.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing assessment data in a blockchain, comprising:
    a processor;
    a communication interface; and
    a memory having a copy of the blockchain and executable code stored thereon, wherein the executable code, when executed by the processor, causes the processor to:
        receive, from an assessment computing system, a request to add a proposed data record to the blockchain, wherein the blockchain comprises a genesis block defining an initial set of assessment parameters, wherein the proposed data record comprises application assessment data;
        validate, using a consensus algorithm, the proposed data record based on the application assessment data;
        append the proposed data record to a block in the blockchain;
        detect, via a blockchain interjector, that the application assessment data requires an update;
            based on detecting that the application assessment data requires the update, trigger the assessment computing system to submit additional application assessment data, wherein triggering the assessment computing system comprises, based on detecting that the application assessment data requires an update, presenting a notification on a display of the assessment computing system, wherein the notification comprises a link that, when activated, presents a graphical interface on the display of the assessment computing system, wherein the graphical interface comprises one or more graphical elements for receiving the additional application assessment data, the additional application assessment data comprising a second set of assessment parameters;
        receive, from the assessment computing system, a second proposed data record, the second proposed data record comprising the additional assessment data;
        detect that the second set of assessment parameters within the second proposed data record have been defined in the initial set of assessment parameters;
        based on detecting that the second set of assessment parameters have been defined, validate, using the consensus algorithm, the second proposed data record based on the additional application assessment data; and
        append the second proposed data record to a new block in the blockchain.

2. The system of claim 1, wherein the blockchain interjector is a security vulnerability interjector, wherein the security vulnerability interjector causes the processor to:
    detect a presence of a security vulnerability affecting an application; and
    trigger the assessment computing system to submit a third proposed data record, the third proposed data record comprising application assessment data associated with the security vulnerability.

3. The system of claim 1, wherein the blockchain interjector is an incident interjector, wherein the incident interjector causes the processor to:
    detect a presence of an incident affecting an application; and
    trigger the assessment computing system to submit a third proposed data record, the third proposed data record comprising application assessment data associated with the incident.

4. The system of claim 1, wherein the blockchain interjector is a periodic interjector, wherein the periodic interjector causes the processor to:
    detect that a threshold amount of time has passed since an application was last assessed; and
    trigger the assessment computing system to submit a third proposed data record, the third proposed data record comprising application reassessment data.

5. The system of claim 1, wherein the blockchain interjector is a regulations interjector, wherein the regulations interjector causes the processor to:
    detect a change in a regulation affecting an application; and
    trigger the assessment computing system to submit a third proposed data record, the third proposed data record comprising application assessment data associated with the change in the regulation.

6. A computer program product for managing assessment data in a blockchain, the computer program product comprising at least one non-transitory computer readable medium having computer-readable program code portions embodied therein, the computer-readable program code portions comprising:
    an executable portion for receiving, from an assessment computing system, a request to add a proposed data record to the blockchain, wherein the blockchain comprises a genesis block defining an initial set of assessment parameters, wherein the proposed data record comprises application assessment data;
    an executable portion for validating, using a consensus algorithm, the proposed data record based on the application assessment data;

an executable portion for appending the proposed data record to a block in the blockchain;
an executable portion for detecting, via a blockchain interjector, that the application assessment data requires an update;
an executable portion for, based on detecting that the application assessment data requires the update, triggering the assessment computing system to submit additional application assessment data, wherein triggering the assessment computing system comprises, based on detecting that the application assessment data requires an update, presenting a notification on a display of the assessment computing system, wherein the notification comprises a link that, when activated, presents a graphical interface on the display of the assessment computing system, wherein the graphical interface comprises one or more graphical elements for receiving the additional application assessment data, the additional application assessment data comprising a second set of assessment parameters;
an executable portion for receiving, from the assessment computing system, a second proposed data record, the second proposed data record comprising the additional assessment data;
an executable portion for detecting that the second set of assessment parameters within the second proposed data record have been defined in the initial set of assessment parameters;
an executable portion for, based on detecting that the second set of assessment parameters have been defined, validating, using the consensus algorithm, the second proposed data record based on the additional application assessment data; and
an executable portion for appending the second proposed data record to a new block in the blockchain.

7. The computer program product of claim 6, wherein the blockchain interjector is a security vulnerability interjector, wherein the computer-readable program code portions further comprise:
an executable portion for detecting a presence of a security vulnerability affecting an application; and
an executable portion for triggering the assessment computing system to submit a third proposed data record, the third proposed data record comprising application assessment data associated with the security vulnerability.

8. The computer program product of claim 6, wherein the blockchain interjector is an incident interjector, wherein the computer-readable program code portions further comprise:
an executable portion for detecting a presence of an incident affecting an application; and
an executable portion for triggering the assessment computing system to submit a third proposed data record, the third proposed data record comprising application assessment data associated with the incident.

9. The computer program product of claim 6, wherein the blockchain interjector is a periodic interjector, wherein the computer-readable program code portions further comprise:
an executable portion for detecting that a threshold amount of time has passed since an application was last assessed; and
an executable portion for triggering the assessment computing system to submit a third proposed data record, the third proposed data record comprising application reassessment data.

10. A computer-implemented method for managing assessment data in a blockchain, the method comprising:
receiving, from an assessment computing system, a request to add a proposed data record to the blockchain, wherein the blockchain comprises a genesis block defining an initial set of assessment parameters, wherein the proposed data record comprises application assessment data;
validating, using a consensus algorithm, the proposed data record based on the application assessment data;
appending the proposed data record to a block in the blockchain;
detecting, via a blockchain interjector, that the application assessment data requires an update;
based on detecting that the application assessment data requires the update, triggering the assessment computing system to submit additional application assessment data, wherein triggering the assessment computing system comprises, based on detecting that the application assessment data requires an update, presenting a notification on a display of the assessment computing system, wherein the notification comprises a link that, when activated, presents a graphical interface on the display of the assessment computing system, wherein the graphical interface comprises one or more graphical elements for receiving the additional application assessment data, the additional application assessment data comprising a second set of assessment parameters;
receiving, from the assessment computing system, a second proposed data record, the second proposed data record comprising the additional assessment data;
detecting that the second set of assessment parameters within the second proposed data record have been defined in the initial set of assessment parameters;
based on detecting that the second set of assessment parameters have been defined, validating, using the consensus algorithm, the second proposed data record based on the additional application assessment data; and
appending the second proposed data record to a new block in the blockchain.

11. The computer-implemented method of claim 10, wherein the blockchain interjector is a security vulnerability interjector, wherein the method further comprises:
detecting a presence of a security vulnerability affecting an application; and
triggering the assessment computing system to submit a third proposed data record, the third proposed data record comprising application assessment data associated with the security vulnerability.

12. The computer-implemented method of claim 10, wherein the blockchain interjector is an incident interjector, wherein the method further comprises:
detecting a presence of an incident affecting an application; and
triggering the assessment computing system to submit a third proposed data record, the third proposed data record comprising application assessment data associated with the incident.

13. The computer-implemented method of claim 10, wherein the blockchain interjector is a periodic interjector, wherein the method further comprises:
detecting that a threshold amount of time has passed since an application was last assessed; and
triggering the assessment computing system to submit a third proposed data record, the third proposed data record comprising application reassessment data.

14. The computer-implemented method of claim 10, wherein the blockchain interjector is a regulations interjector, wherein the method further comprises:
- detecting a change in a regulation affecting an application; and
- triggering the assessment computing system to submit a third proposed data record, the third proposed data record comprising application assessment data associated with the change in the regulation.

\* \* \* \* \*